(12) United States Patent
Pierce et al.

(10) Patent No.: US 6,786,373 B2
(45) Date of Patent: Sep. 7, 2004

(54) ADJUSTABLE FRAME FOR RETAINING HAND TRUCK ON VEHICULAR BODY

(75) Inventors: John M. Pierce, High Point, NC (US); Bill Snowa, Jamestown, NC (US)

(73) Assignee: Mickey Truck Bodies, Inc., High Point, NC (US)

(*) Notice: Subject to any disclaimer, the term of this patent is extended or adjusted under 35 U.S.C. 154(b) by 78 days.

(21) Appl. No.: 09/972,079

(22) Filed: Oct. 5, 2001

(65) Prior Publication Data

US 2002/0040918 A1 Apr. 11, 2002

Related U.S. Application Data

(60) Provisional application No. 60/238,191, filed on Oct. 5, 2000.

(51) Int. Cl.[7] .................................................. B60R 9/06
(52) U.S. Cl. ...................... 224/501; 224/512; 224/532; 224/536; 224/543; 224/558; 224/567; 224/570; 414/462
(58) Field of Search ................................ 224/501, 512, 224/514, 532, 536, 543, 558, 567, 570; 414/462; 280/769

(56) References Cited

U.S. PATENT DOCUMENTS

| | | | |
|---|---|---|---|
| 2,966,275 A | * 12/1960 | Brookins | .............. 414/462 |
| 3,443,730 A | 5/1969 | Meusel | .............. 224/42.03 |
| 3,794,227 A | * 2/1974 | Stearns | .............. 224/532 |
| 4,061,257 A | 12/1977 | St. Clair | .............. 224/42.08 |

(List continued on next page.)

OTHER PUBLICATIONS

W. F. Mickey, Inc., Drawing No. BB124492, Rev. 3, Handtruck Rack, Left Hand, Mar. 15, 1999, USA.
W. F. Mickey, Inc., Drawing No. BB624973, Bottom, Hand Truck Rack, Apr. 23, 1998 USA.
W. F. Mickey, Inc., Drawing No. BB626697, Rev. 3, Bracket, Locking Bar, Hinged Side, Handtruck Rack, Mar. 12, 1999, USA.
W. F. Mickey, Inc., Drawing No. BB626698, Rev. 3, Bracket, Locking Bar, Latched Side, Handtruck Rack, Mar. 12, 1999, USA.
W. F. Mickey, Inc., Drawing No. BB624295, Locking Bar, Hand Truck Rack Setup for Amanda Punching, Jan. 9, 1998, USA.
W. F. Mickey, Inc., Drawing No. BB626870, Hinge, Cam Locking Bar, Handtruck Rack, Mar. 15, 1999, USA.
W. F. Mickey, Inc., Drawing No. BB626289, Bracket, Hand Truck Mounting, Jan. 12, 1998, USA.
W. F. Mickey, Inc., Drawing No. BB626294, Gusset, Upright Reinf., Handtruck Rack to Bumper, Jan. 29, 1998, USA.
W. F. Mickey, Inc., Drawing No. BB626590, Bracket, Locking Bar Slam Bumper, Handtruck Rack, FEb. 2, 1999, USA.

(List continued on next page.)

Primary Examiner—Gary E. Elkins
(74) Attorney, Agent, or Firm—Kennedy Covington Lobdell & Hiekman, LLP

(57) ABSTRACT

An adjustable frame, mountable on a vehicle, for releasably securing hand trucks of different sizes and configurations includes: a support platform for receiving a base of a hand truck; a first and a second side member affixed to the platform; a first bracket and a second bracket attached to the first and second side members, respectively, the brackets extending in parallel therewith; an elongate swing bar pivotally connected to the first bracket and pivotal between a first position that retains the hand truck on the platform, and a second position, which allows access and removal of the hand truck from the platform; and a latch mounted on the swing bar. The second bracket may include a strike that engages the latch for releasably securing the swing bar in the first position. Cushioned crossbars attachable to the side members dampen vibration of the hand truck during transportation.

85 Claims, 10 Drawing Sheets

U.S. PATENT DOCUMENTS

| | | | | |
|---|---|---|---|---|
| 4,140,327 A | | 2/1979 | Hackney, III | 280/163 |
| 4,437,599 A | * | 3/1984 | Jordening | 224/532 |
| 4,459,821 A | | 7/1984 | Cabell et al. | 62/239 |
| 4,531,278 A | | 7/1985 | Boykin | 29/469 |
| 5,133,489 A | | 7/1992 | Loew et al. | 224/42.39 |
| 5,236,342 A | | 8/1993 | Pellettier | 224/42.03 R |
| 5,328,066 A | | 7/1994 | Cappuccio et al. | 224/42.03 R |
| 5,337,932 A | * | 8/1994 | Griewahn | 224/532 |
| 5,449,100 A | * | 9/1995 | Eckhart | 414/462 |
| 5,522,530 A | | 6/1996 | Boettcher | 224/488 |
| 5,673,834 A | * | 10/1997 | Cannon | 224/567 |
| 5,738,261 A | | 4/1998 | Dula | 224/533 |
| 5,826,768 A | | 10/1998 | Gamulo | 224/486 |
| 5,853,181 A | | 12/1998 | Booras | 280/47.35 |
| 6,427,891 B1 | * | 8/2002 | Anderson et al. | 224/536 |

OTHER PUBLICATIONS

W. F. Mickey, Inc., Left–side Perspectice Illustration of Handtruck Rack, USA.

W. F. Mickey, Inc., Close–up Illustration of Bracket and Locking Bar on Hinged Side of Handtruck Rack, USA.

W. F. Mickey, Inc., Close–up Illustration of Bracket and Locking Bar on Latched Side of Handtruck Rack, USA.

W. F. Mickey, Inc., Right–side Perspective Illustration of Handtruck Rack, USA.

W. F. Mickey, Inc., Illustration of Brackets, Locking Bar and Latch Mechanism of Handtruck Rack, USA.

W. F. Mickey, Inc., Close–up Illustration of Bracket, Locking Bar and Latching Mechanism of Handtruck Rack, USA.

* cited by examiner

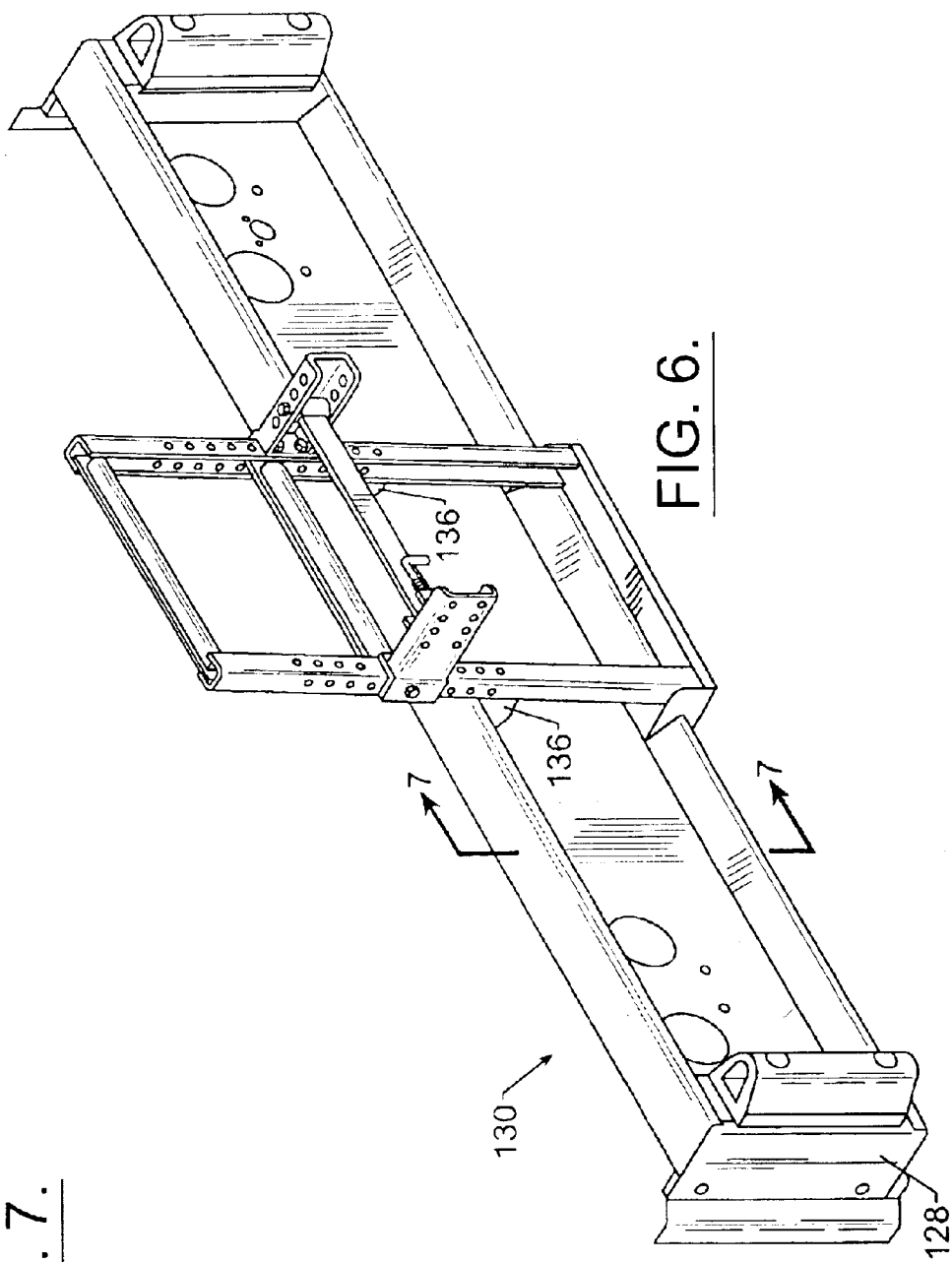
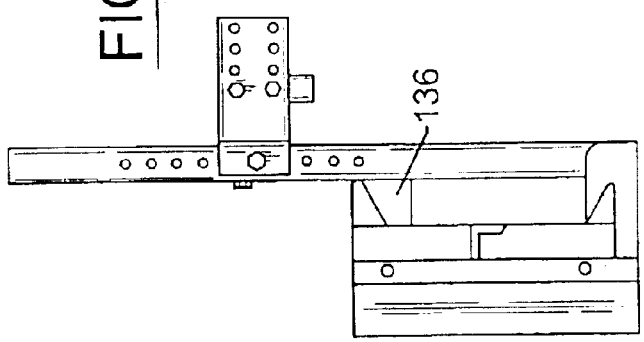

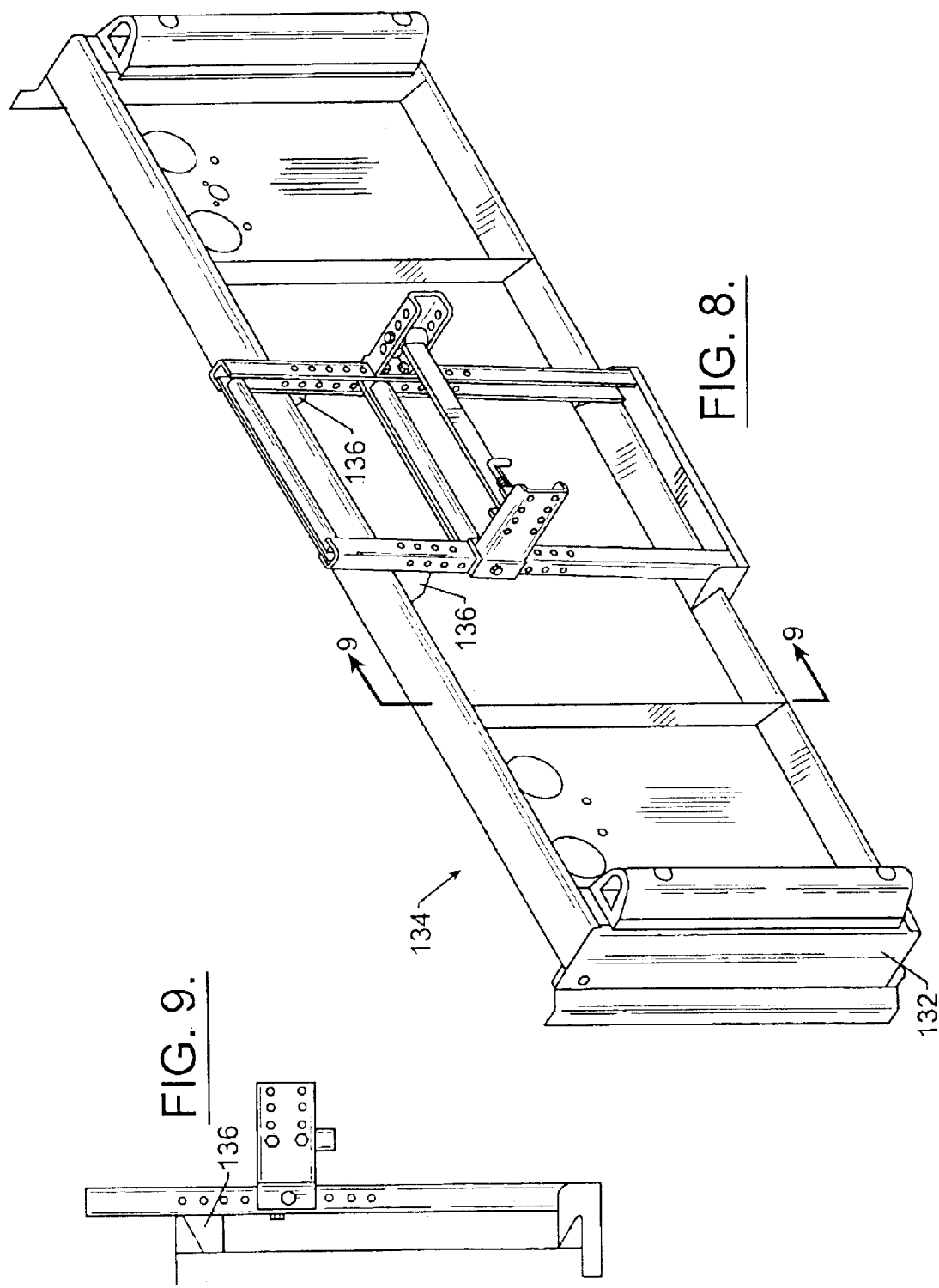

United States Patent US 6,786,373 B2

ADJUSTABLE FRAME FOR RETAINING HAND TRUCK ON VEHICULAR BODY

CROSS REFERENCE TO RELATED APPLICATION

This application claims the benefit of U.S. Provisional Patent Application No. 60/238,191, filed Oct. 5, 2000, incorporated herein by reference.

FIELD OF THE PRESENT INVENTION

The present invention relates to a frame mounted on a vehicular body for transporting a hand truck and, in particular, to such a frame that is adjustable for accommodating hand trucks of different sizes and configurations, and to a method of adjusting such a frame.

BACKGROUND OF THE PRESENT INVENTION

A frame mounted on a vehicular body for transporting a hand truck is well known in the art. Such frames are disclosed, for example, by U.S. Pat. No. 5,522,530 to Boettcher; U.S. Pat. No. 5,236,342 to Pellettier; and U.S. Pat. No. 3,443,730 to Meusel, each patent of which is expressly incorporated herein by reference.

Hand trucks (or "dollies") are often carried on the vehicular bodies of delivery trucks for convenience. At each stop of the delivery truck, the hand truck is readily available to assist the driver in unloading and transporting the cargo to be delivered like, for example, boxed cans of beverages including soda and beer.

Each manufacturer of the vehicular body commonly includes a frame for transporting a hand truck in the design of the vehicular body. In doing so, however, the manufacturer must either predetermine the size and configuration of the hand truck that will be used with the frame by contacting the customer for the vehicular body, or the manufacturer must make a "best guess" of the size and configuration of the hand truck that will be used with the frame. Unfortunately, most often the hand truck that is ultimately used with the frame is either not the hand truck that is initially specified by the customer, or it is not the hand truck that was guessed by the manufacturer. In any event, to accommodate the customer in the interests of customer care, the manufacturer defacto will send, at the manufacturer's expense, the customer a differently sized frame specifically customized for the actual hand truck used.

Accordingly, a specific need exists by which a manufacturer can build a vehicular body including a frame which is adjustable and which accommodates a variety of hand trucks which the customer ultimately might use.

SUMMARY OF THE PRESENT INVENTION

Generally, the present invention relates to an adjustable frame for accommodating different hand trucks (i.e., hand trucks having a different size and/or configuration), and a method of adjusting such a frame. Briefly summarized, the frame of the present invention includes: (a) a bottom support platform adapted to receive a base of a hand truck; (b) first and second side members affixed to the platform and extending upwardly therefrom in spaced, generally parallel relation; (c) a first bracket attached to the first side member and a second bracket attached to the second side member, the brackets extending outwardly from the side members in spaced, generally parallel relation; (d) an elongate swing bar pivotally connected to the first bracket and pivotal between (i) a first position, whereat the swing bar extends between the first and second brackets for retention of the hand truck on the platform, and (ii) a second position, whereat the swing bar extends generally parallel with the brackets for access and removal of the hand truck from the platform; and (e) a latch mounted on the swing bar for releasable securement of the swing bar to the second bracket when in the first position.

In accordance with a first feature of the present invention, each side member includes a plurality of attachment locations defined therealong at different spacings from the platform for selective attachment of the brackets to the side members at different heights from the platform. Preferably, each attachment location comprises an array of openings defined by the side member, with the array of openings corresponding with an array of openings defined by a bracket for extension therethrough of removable fasteners.

In accordance with a second feature of the present invention, the first bracket includes a plurality of connection locations defined therealong at different spacings from the first side member for selective pivotal connection of the swing bar to the first bracket at different depths from the first side member. Preferably, each connection location comprises an array of openings defined by the first bracket and adapted to receive the swing bar in pivotal connection therein. The attachment locations and the connection locations provide a method of adjusting, respectively, the height and depth of the frame for accommodation of different hand trucks.

A third feature of the present invention includes a strike mounted to the second bracket for engagement with the latch carried on the swing bar whereby the swing bar is securely retained on the frame during transportation. In particular, the strike preferably engages a latch bolt of the latch for releasable securement of the swing bar when in the first position. Moreover, the latch bolt preferably is spring-biased to engage a catch of the strike when the swing bar moves into the first position from the second position. The frame also preferably includes a backstop including a first portion mounted on the second bracket and a second portion extending generally coplanar with the swing bar when in the first position and defining an opening in register with an opening in the swing bar for receipt through both of the openings of a bolt of a lock for protection of the band truck from theft. The first portion of the backstop preferably is oriented orthogonal to the second portion, and the first portion preferably extends between the strike and the second bracket. In accordance with this third feature and an aforesaid adjustability feature of the frame, the second bracket includes a plurality of connection locations defined therealong at different spacings from the second side member for selective connection of the strike to the second bracket at different depths from the second side member. Preferably, each connection location comprises an array of openings that corresponds with the array of openings defined by the strike.

BRIEF DESCRIPTION OF THE DRAWINGS

Further features, embodiments, and advantages of the apparatus and method of the present invention will become apparent from the following detailed description with reference to the drawings, wherein:

FIG. 6 is a perspective view of the frame of FIG. 1 mounted on the bumper of a first vehicular body;

FIG. 7 is an elevational view of the frame of FIG. 6 taken along the line 7—7;

FIG. 8 is a perspective view of the frame of FIG. 1 mounted on the bumper of a second vehicular body;

FIG. 9 is an elevational view of the frame of FIG. 8 taken along the line 8—8;

DETAILED DESCRIPTION OF PREFERRED EMBODIMENTS

Figure 1:
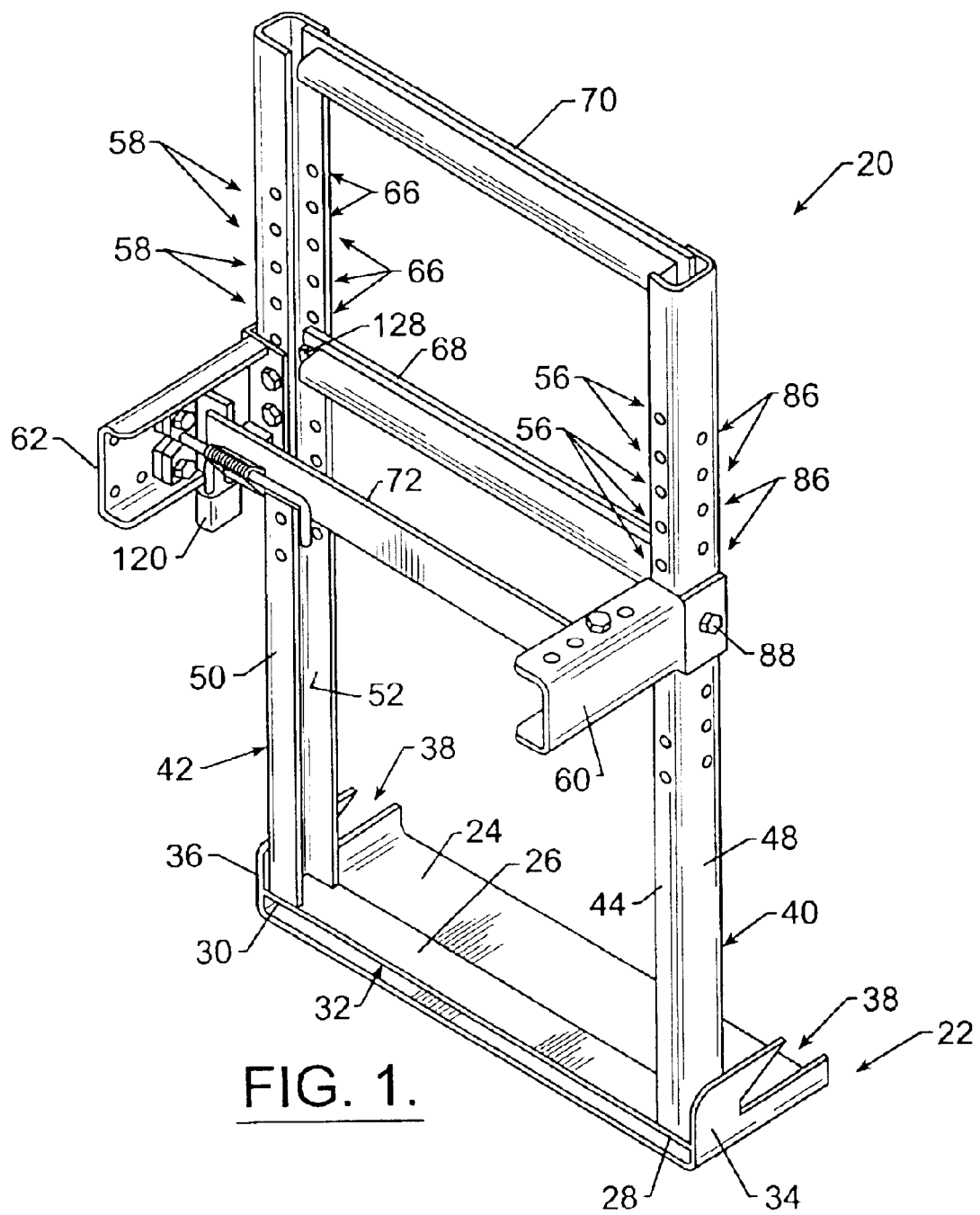
FIG. 1 is a perspective view of the front of a frame for retaining a hand truck on a vehicular body in accordance with the present invention.

Referring now to the drawings, a preferred frame 20 of the present invention generally is shown in perspective view in FIGS. 1–5. The frame 20 includes a bottom support platform 22 comprising an elongated U-shaped ledge 24 and a flat bar 26 welded at its ends 28,30 to the ledge 24 to thereby form a generally rectangular opening 32 adapted to receive the base of a hand truck (not shown). In particular, the opening 32 is dimensioned to receive therethrough a plate of the base of the hand truck as is conventional. Upturned end walls 34,36 of the U-shaped ledge 24 each includes a recess 38 designed to conform to a surface configuration of a bumper of a vehicular body for mounting of the platform 22 thereto, all as will be more fully described below with references to FIGS. 6–9.

With continued reference to FIGS. 1–5, the frame 20 includes first and second side members 40,42 that are affixed to the platform 22 by welding. The two side members 40,42 extend upwardly from the upturned end walls 34,36 of the platform 22 in spaced, parallel relation to each other. The first side member 40 comprises a U-shaped rail having front and rear end walls 44,46 and an intermediate wall 48 and, in similar manner, the second side member 42 comprises a U-shaped rail having front and rear end walls 50,52 and an intermediate wall 54. Each front wall 44,50 includes a plurality of openings 56,58 respectively which define a plurality of attachment locations for selective attachment of first and second brackets 60,62, as will be more fully described below. Likewise, each rear wall 46,52 of the side members 40,42 also includes a plurality of openings 64,66 respectively which define a plurality of attachment locations for selective attachment of a crossbar 68 to the side members 40,42, also as will be more fully described below.

The side members 40,42 are joined at their upper ends by the welding of a top crossbar 70 to the rear walls 46,52 thereof resulting in great rigidity of the side members 40,42 and the frame 20 overall.

Figure 10:
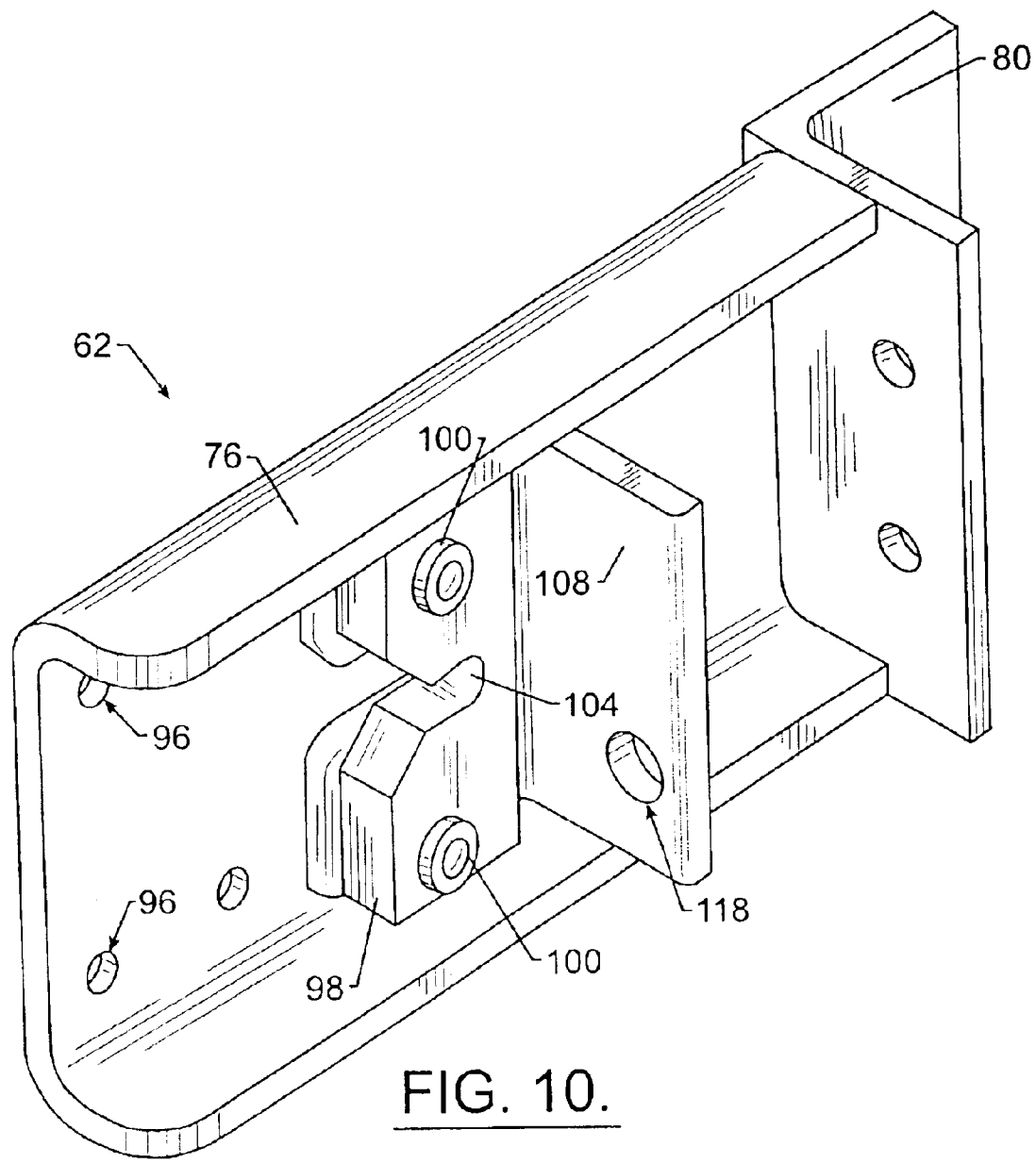
FIG. 10 is a perspective view of a bracket, strike and backstop of the frame of FIG. 1.
Figure 11:
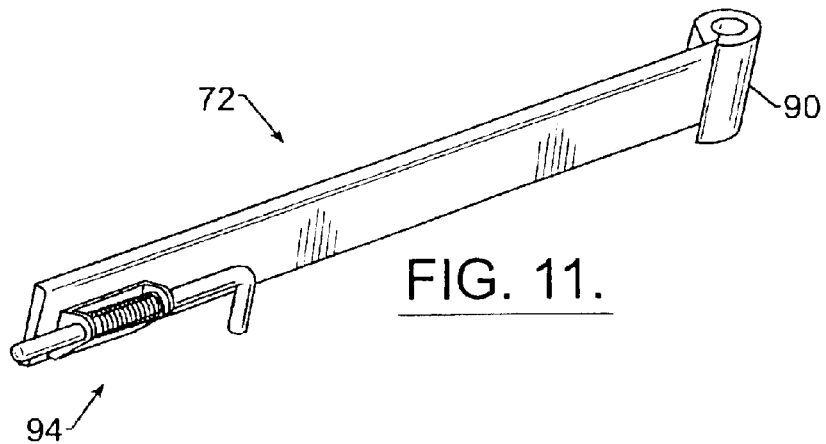
FIG. 11 is a perspective view of the swing bar and latch of the frame of FIG. 1.
Figure 12:
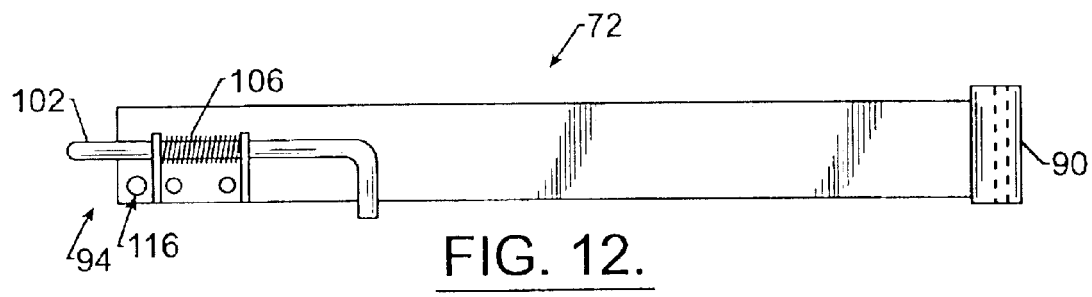
FIG. 12 is an elevational view of the front of the swing bar and latch of the frame of FIG. 1.
Figure 13:
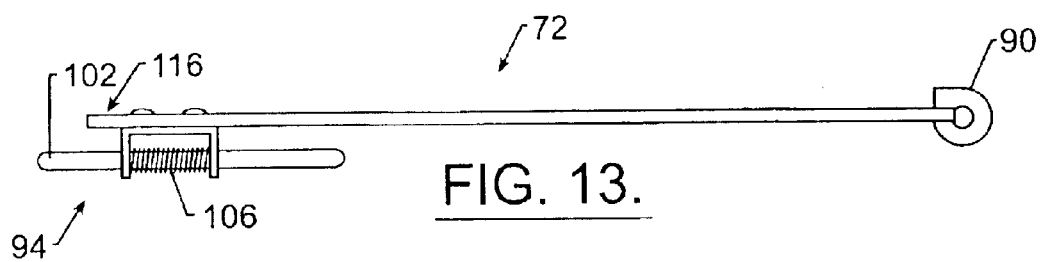
FIG. 13 is a plan view of the top of the swing bar and latch of the frame of FIG. 1.
Figure 14:
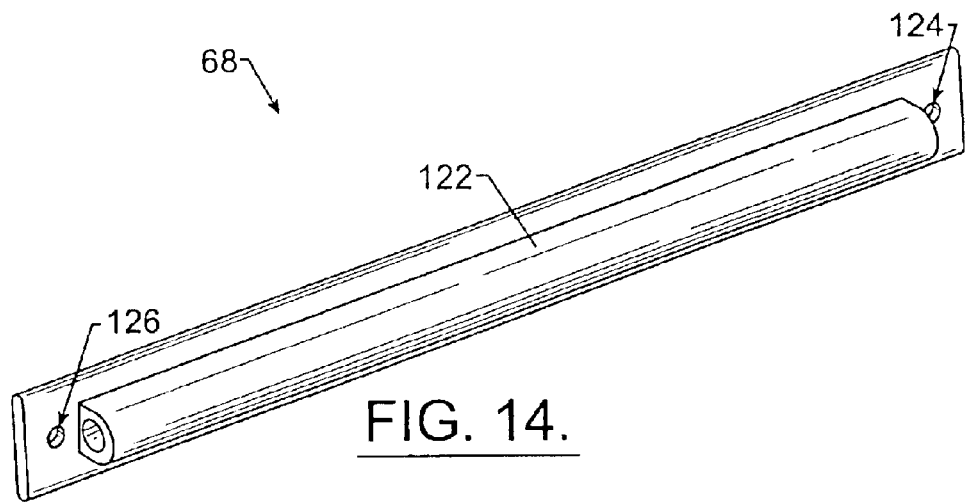
FIG. 14 is a perspective view of a crossbar of the frame of FIG. 1.
Figure 15:
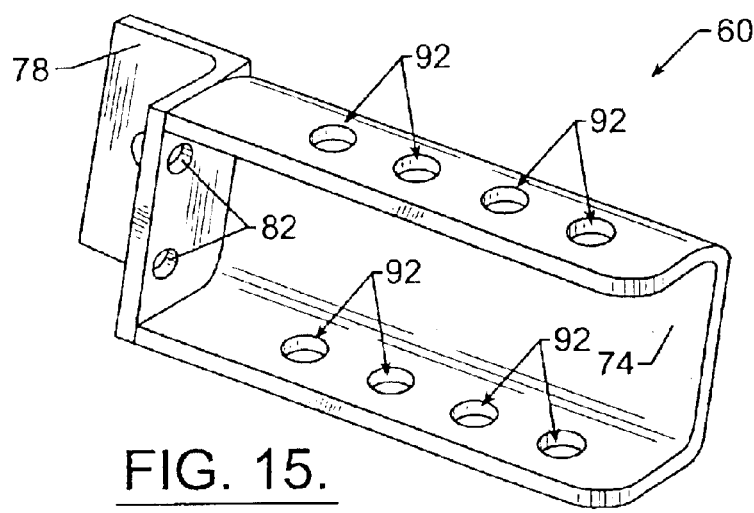
FIG. 15 is a perspective view of the other bracket of the frame of FIG. 1.

The first and second brackets 60,62 referred to above serve to support a swing bar 72 which retains the hand truck on the frame 20 during transportation. The first bracket 60 is shown in detail in FIG. 15, the second bracket 62 is shown in detail in FIG. 10, and the swing arm is shown in detail in FIGS. 11–13.

In particular, each bracket 60,62 respectively includes a U-shaped channel portion 74,76 and a right-angle mounting portion 78,80 welded to an end thereof. The first bracket 60 is attached to the first side member 40 at one of the plurality of attachment locations defined by two adjacent openings 56 disposed along the first side member 40. In this respect, each attachment location thereof includes an array of openings 56 formed in the front wall 44 of the first side member 40, which array corresponds with an array of openings 82 formed in the mounting portion 78 of the first bracket 60 whereby removable fasteners, such as bolts 84, attach the first bracket 60 to the first side member 40. For further support of the first bracket 60, an additional opening 86 is defined by the intermediate wall 48 of the first side member 40 as part of the array of openings for an additional point of attachment of the mounting portion 78 of the first bracket 60 with another removable fastener 88. The second bracket 62 is attached to the second side member 42 in like fashion with attachment locations on the second side member 42 corresponding at the same height from the platform 22 with attachment locations on the first side member 40. Accordingly, the first and second brackets 60,62 are attached to the side members 40,42 at the same height from the platform 22.

The first and second brackets 60,62 extend from the side members 40,42 in spaced, generally parallel relation to each other. The first bracket 60 includes a plurality of connection locations defined therealong for the pivotal connection thereon of a hinge 90 of the swing bar 72 at different spacings from the first side member 40. Each connection location preferably includes an array of opposed openings 92 having a common axis through which the ends of the hinge 90 of the swing bar 72 are received.

The swing bar 72 itself is elongate and includes the hinge 90 on one end and a latch 94 on the other end. The swing bar 72 pivots between a first position extending between the first and second brackets 60,62 and a second position extending generally parallel to the first and second brackets 60,62. The second bracket 62 includes an array of connection locations defined by openings 96 disposed therealong for the mounting of a strike 98 thereon at different spacings from the second side member 42. Preferably, each connection location on the second bracket 62 includes an array of openings 96 which correspond with an array of openings on the strike 98 for mounting thereof to the second bracket 62 with removable fasteners 100. In the preferred embodiment, the spacing of the strike 98 from the second side member 42 is substantially the same as the spacing of the hinge 90 from the first side member 40.

The strike 98 is adapted to receive a latch bolt 102 of the latch 94 when the swing bar 72 moves into the first position from the second position. Specifically, the strike 98 includes a catch 104 that pivots to permit passage of the latch bolt 102 in the direction from the second position toward the first position, but which does not permit passage of the latch bolt 102 in the opposite direction.

The latch bolt 102 itself is spring-biased so that the latch bolt 102 prevents the swing bar 72 from moving out of the first position when engaged by the strike 98. In order to unlatch the swing bar 72, the latch bolt 102 must be moved against the biasing of the spring 106 toward the first bracket 60 and, thereby, withdrawn from the strike 98, whereat the swing bar 72 is then able to pivot from the first position toward the second position.

Figure 16:
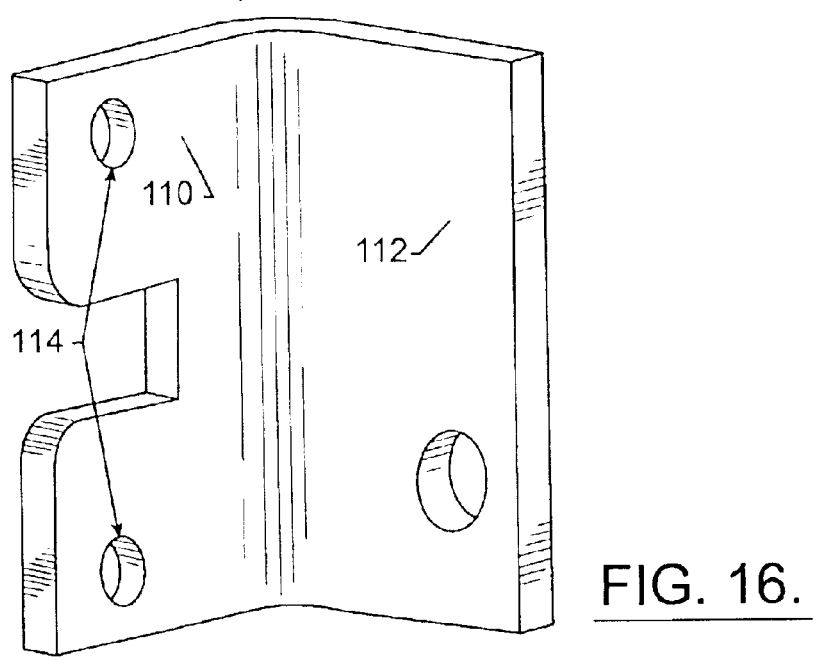
FIG. 16 is a perspective view of the backstop of the frame of FIG. 1.

A backstop 108 is provided for inhibiting movement of the swing bar 72 away from the second position past the first position. The backstop 108 is shown in detail in FIG. 16 and preferably comprises two planar portions 110,112 joined together orthogonal to one another. A first planar portion 110 includes an array 114 of openings corresponding to the array of openings 96 of the connection locations of the second bracket 62, whereby the first planar portion 110 is mounted to the second bracket 62 inbetween the second bracket 62 and the strike 98. The second planar portion 112 extends parallel to the backside of the end of the swing bar 72. The end of the swing bar 72 and the second planar portion 112 each includes respectively a coaxial opening 116,118 through which the bolt of a lock 120 is extendable for locking of the swing bar 72 in the first position for protection from theft of a hand truck retained on the frame 20.

The frame 20 also includes a crossbar 68 provided for abutment with the hand truck when retained on the frame 20 though engagement with the swing bar 72 when closed in the first position. The crossbar 68 includes a cushion portion 122 formed of rubber for engagement with the hand truck for dampening of any vibration or rattling that otherwise might occur during transportation of the hand truck. As set forth above, the rear walls 46,52 of the side members 40,42 each respectively include a plurality of attachment locations each comprising an opening 64,66. Each end of the crossbar 68 includes a respective opening 124,126 that is spaced from the other to correspond with the spacing between the pairs of attachment locations on the side members 40,42 having the same height from the platform 22. Accordingly, the crossbar 68 is removably mounted to the rear walls 46,52 of the side members 40,42 in a generally horizontal orientation therebetween and at a selected height by removable fasteners such as bolts 128.

The frame is mounted in conventional manner to the bumper 128 of a vehicular body 130 as shown, for example, in FIGS. 6–7, and to a different bumper 132 of another vehicular body 134 as shown, for another example, in FIGS. 8–9. In each instance, the platform 22 is welded to the bumper 128,132 along the recesses 38 thereof. Additionally, gussets 136 are welded to the bumper 128,132 and to the side members 40,42 of the frame 20. It is understood that the frame may also be mounted on structures other than vehicles.

Figure 2:
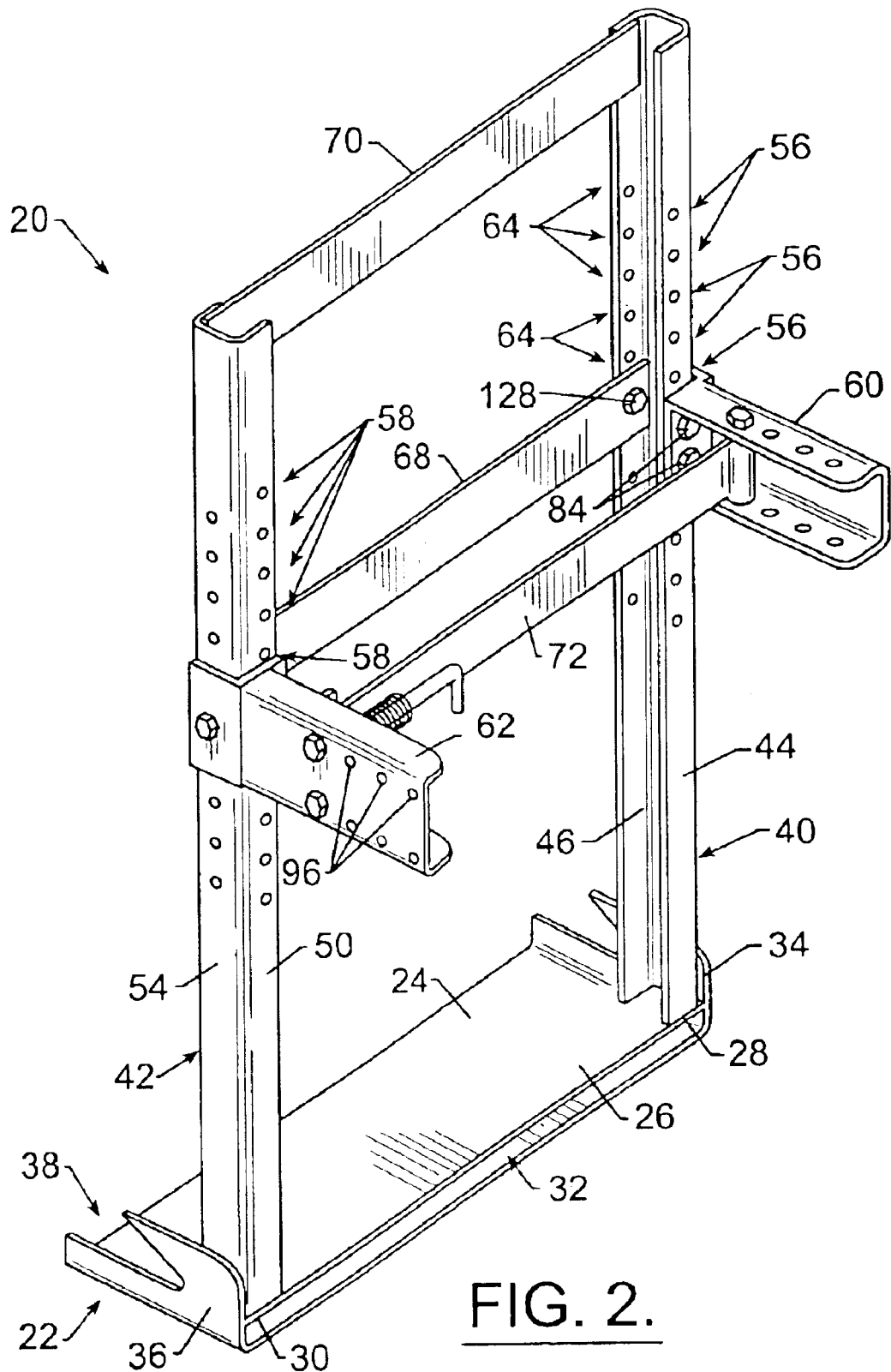
FIG. 2 is another perspective view of the front of the frame of FIG. 1.
Figure 3:
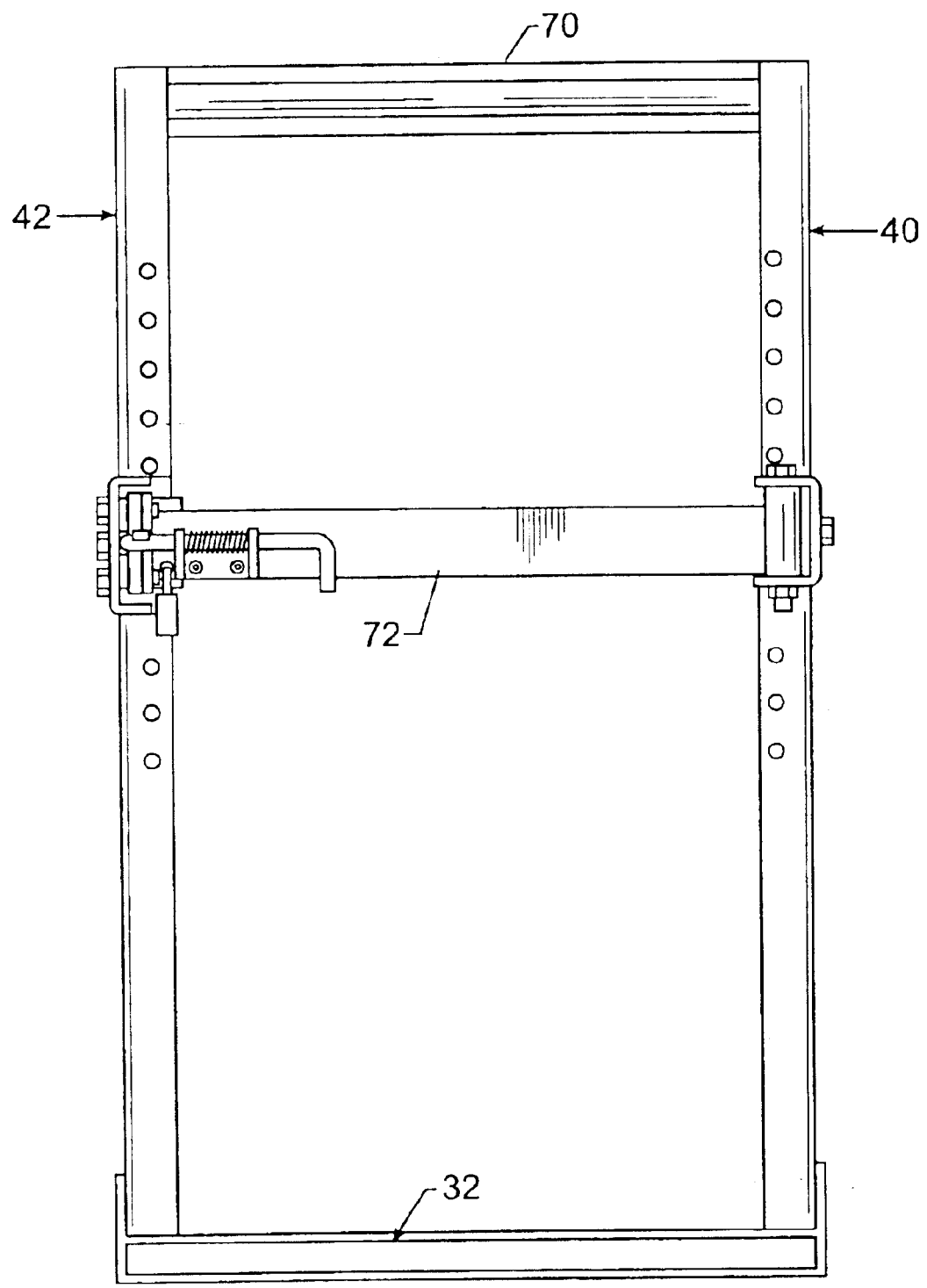
FIG. 3 is an elevational view of the front of the frame of FIG. 1.
Figure 4:
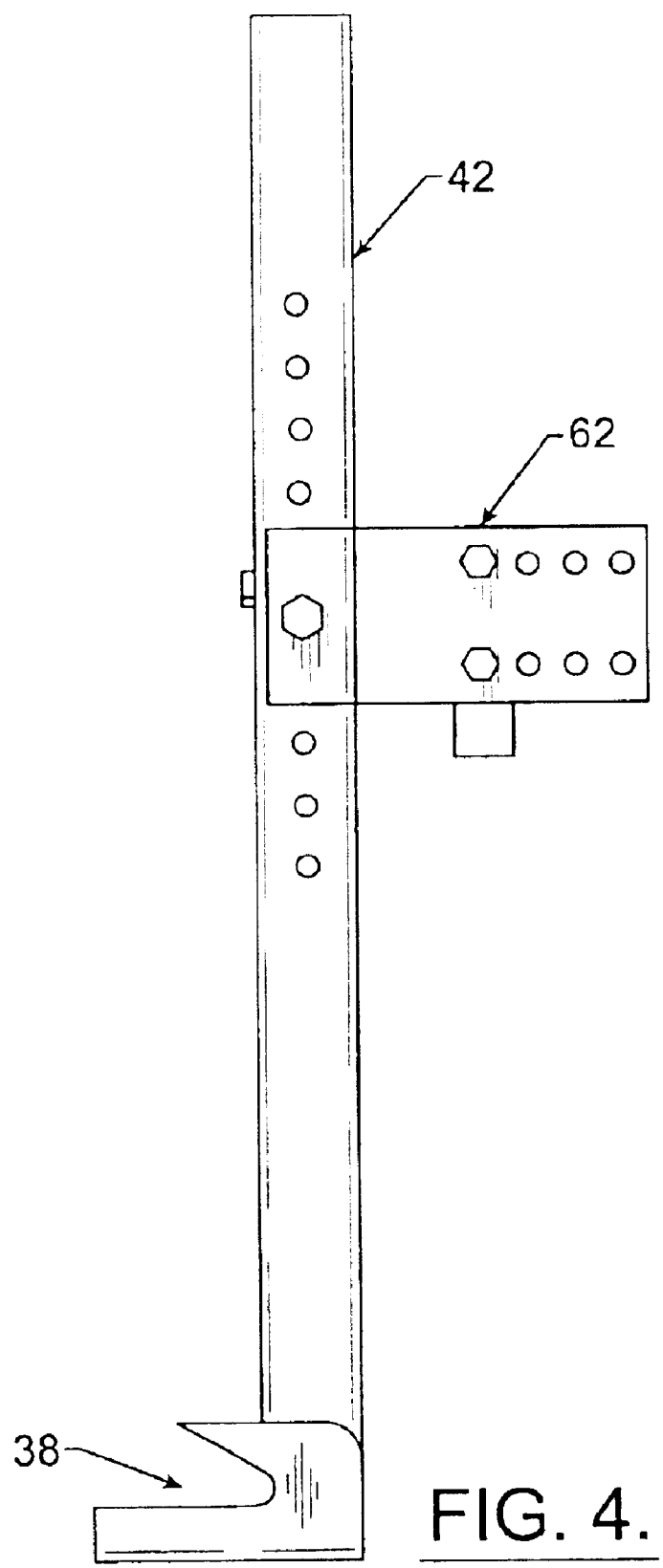
FIG. 4 is an elevational view of a side of the frame of FIG. 1.
Figure 5:
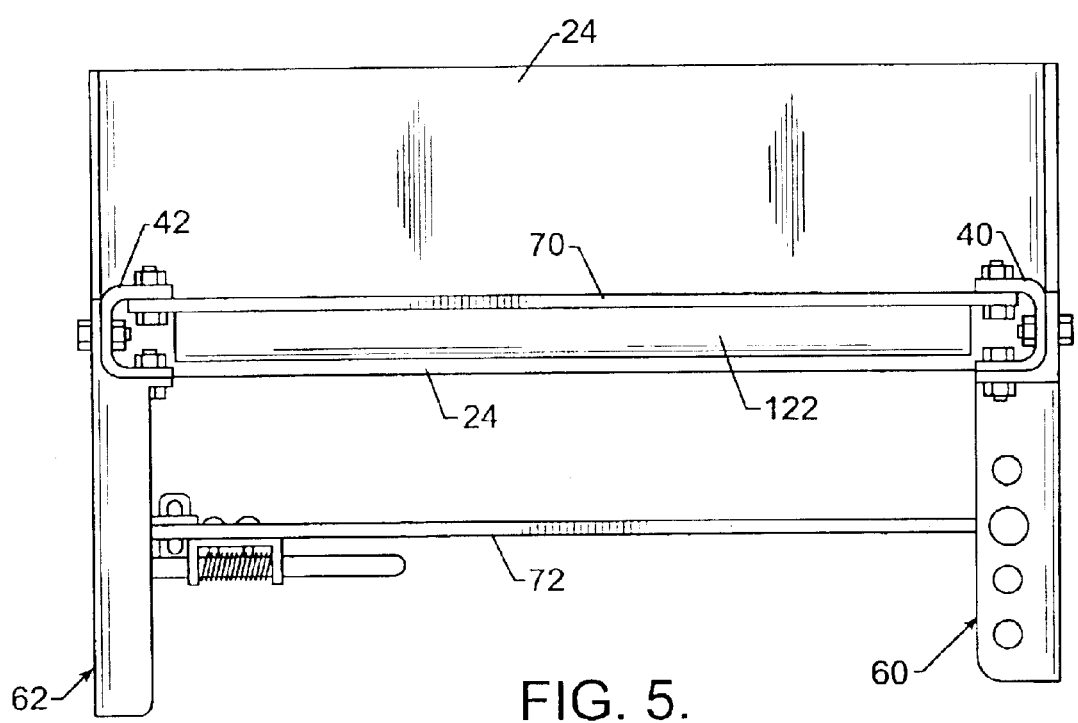
FIG. 5 is a top plan view of the frame of FIG. 1.

As shown in FIGS. 1 and 2, the first and second brackets are mounted at first attachment locations on the side members in order for the swing bar to have a predetermined, desired height from the platform which will accommodate a hand truck of a certain size and configuration. In order to accommodate a new hand truck of a different size and configuration, the removable fasteners are removed from the brackets and side members, the brackets are repositioned at different attachment locations along the side members at the desired height, and the removable fasteners are reinserted through the corresponding arrays of openings to reattach the brackets to the side members at the new, desired height for the new hand truck. In similar manner, the frame is also adjustable to accommodate the depth of a new hand truck. In this regard, the place of the releasable mounting of the hinge of the swing bar and the strike can be selected at one of a plurality of connection locations along the first and second brackets, respectively, with each connection location of the plurality on a respective bracket having a different lateral spacing from the respective side member. Likewise, the crossbar is removably mounted to the rear walls of the side members in a generally horizontal orientation therebetween and at a selected height by removable fasteners such as bolts. The frame thereby is even further adjustable for accommodating hand trucks of different sizes and configurations.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

Thus, for example, the side members are not necessarily required for practicing certain features of the present invention. For example, the platform, brackets, and crossbar each can be affixed to the vehicular body without interconnection thereof with side members. Of course, in this embodiment of the present invention, the frame could be adjustable with respect to the depth of a hand truck that could be accommodated, but the height would not necessarily be adjustable. Furthermore, the frame could also include the mounting of the strike to the second bracket for secure retention of the swing arm without any features of adjustability and still fall within the scope of the present invention as claimed, a feature of the claimed invention including the mere mounting of a strike to the second bracket.

What is claimed is:

1. An adjustable frame for releasably retaining a hand truck, comprising:
   a) a bottom support platform adapted to receive a base of the hand truck;
   b) first and second side members affixed to said platform and extending upwardly therefrom in spaced, generally parallel relation;
   c) a first bracket attached to said first side member and a second bracket attached to said second side member, said brackets extending outwardly from said side members in spaced, generally parallel relation;
   d) an elongate swing bar pivotally connected to said first bracket and pivotal between
      i) a first position, in which said swing bar extends generally between said first and second brackets for retention of the hand truck on said platform, and
      ii) a second position, in which said swing bar extends generally parallel with said brackets for access and removal of the hand truck from the platform; and
   e) a latch mounted on said swing bar for releasable securement of said swing bar to said second bracket when in said first position;

wherein each said side member includes a plurality of attachment locations defined therealong at different spacings from said platform for selective attachment of said brackets to said side members at different heights from said platform.

2. An adjustable frame according to claim 1, wherein each said attachment location comprises an array of openings defined by said side member, said array of openings corresponding with an array of openings defined by a said bracket for extension therethrough of removable fasteners.

3. An adjustable frame according to claim 1, further comprising a top crossbar extending between and affixed to said first and second side members opposite said platform, and abutting said hand truck when retained by said swing arm on said adjustable frame.

4. An adjustable frame according to claim 3, further comprising a cushion portion affixed to the top crossbar in abutting orientation relative to the hand truck.

5. An adjustable frame according to claim 1, wherein said first bracket includes a plurality of connection locations defined therealong at different spacings from said first side member for selective pivotal connection of said swing bar to said first bracket at different depths from said first side member.

6. An adjustable frame according to claim 5, wherein each said connection location comprises an array of openings defined by said first bracket and adapted to receive said swing bar in pivotal connection therein.

7. An adjustable frame according to claim 1, further comprising a strike mounted on said second bracket which receives a bolt of said latch for releasable securement of said swing bar when in said first position.

8. An adjustable frame according to claim 7, wherein said bolt is spring-biased to engage said strike when said swing bar moves into said first position from said second position.

9. An adjustable frame according to claim 7, wherein said latch bolt does not extend through said second bracket when said swing arm is secured by said strike.

10. An adjustable frame according to claim 7, wherein said second bracket includes a plurality of connection locations defined therealong at different spacings from said second side member for selective connection of said strike to said second bracket at different depths from said second side member.

11. An adjustable frame according to claim 10, wherein each said connection location comprises an array of openings defined by said second bracket, said array of openings corresponding with an array of openings defined by said strike for extension therethrough of removable fasteners.

12. An adjustable frame according to claim 1, further comprising a backstop including a first portion mounted on said second bracket and a second portion extending generally coplanar with said swing bar when in said first position.

13. An adjustable frame according to claim 12, wherein said second portion defines an opening in register with an opening in said swing bar when in said first position for receipt through both said openings of a bolt of a lock.

14. An adjustable frame according to claim 7, further comprising a backstop including a first portion mounted on said second bracket and a second portion extending generally coplanar with said swing bar when in said first position.

15. An adjustable frame according to claim 14, wherein said first portion of said backstop is oriented orthogonal to said second portion and wherein said first portion extends between said strike and said second bracket.

16. An adjustable frame according to claim 1, further comprising a crossbar attached to said first and second side members for abutment with the hand truck when retained on the frame, each said side member including a plurality of attachment locations defined therealong at different spacings from said platform for selective attachment of said crossbar to said side members at different heights from said platform.

17. The adjustable frame according to claim 16, wherein each said attachment location on said first side member comprises an opening that corresponds with an opening defining a said attachment location on said second side member, and wherein said crossbar defines two openings that register with said corresponding openings on said side members for receipt therethrough of removable fasteners such that said crossbar is attached to said side members in substantially horizontal orientation.

18. The adjustable frame according to claim 16, wherein said crossbar is attached at a different height from said platform than that of said first and second brackets.

19. The adjustable frame according to claim 16, wherein each said side member comprises a U-shaped rail having front and rear end walls and an intermediate wall with said front and rear end walls extending from said intermediate wall toward the other said side member.

20. The adjustable frame according to claim 19, wherein said first and second brackets extend outwardly from said front end walls of said first and second side members, respectively, and wherein said crossbar is attached to said rear end walls of said side members.

21. The adjustable frame according to claim 16, wherein a cushion is affixed to said crossbar in abutting orientation relative to the hand truck.

22. An adjustable frame for releasably retaining a hand truck on a vehicle, comprising:
 a) a bottom support platform adapted to receive a base of the hand truck;
 b) first and second side members affixed to said platform and extending upwardly therefrom in spaced, generally parallel relation;
 c) a first bracket attached to said first side member and a second bracket attached to said second side member, said brackets extending outwardly from said side members in spaced, generally parallel relation, each said side member including a plurality of attachment locations defined therealong at different spacings from said platform for selective attachment of said brackets to said side members at different heights from said platform;
 d) an elongate swing bar pivotally connected to said first bracket and pivotal between
  i) a first position, in which said swing bar extends generally between said first and second brackets for retention of the hand truck on said platform, and
  ii) a second position, in which said swing bar extends generally parallel with said brackets for access and removal of the hand truck from the platform; and
 e) a latch mounted on said swing bar for releasable securement of said swing bar to said second bracket when in said first position.

23. An adjustable frame according to claim 22, wherein each said attachment location comprises an array of openings defined by said side member, said array of openings corresponding with an array of openings defined by a said bracket for extension therethrough of removable fasteners.

24. An adjustable frame for retaining a hand truck on a vehicle during transportation, comprising:
 a) a bottom support platform adapted to receive a base of the hand truck;

b) first and second side members affixed to said platform and extending upwardly therefrom in spaced, generally parallel relation;

c) a first bracket attached to said first side member and a second bracket attached to said second side member, said brackets extending outwardly from said side members in spaced, generally parallel relation;

d) an elongate swing bar pivotally connected to said first bracket and pivotal between
  i) a first position, in which said swing bar extends generally between said first and second brackets for retention of the hand truck on said platform, and
  ii) a second position, in which said swing bar extends generally parallel with said brackets for access and removal of the hand truck from the platform,
  said first bracket including a plurality of connection locations defined therealong at different spacings from said first side member for selective pivotal connection of said swing bar to said first bracket at different depths from said first side member; and e) a latch mounted on said swing bar for releasable securement of said swing bar to said second bracket when in said first position.

25. An adjustable frame according to claim 24, wherein each said connection location comprises an array of openings defined by said first bracket and adapted to receive said swing bar in pivotal connection therein.

26. An adjustable frame according to claim 25, further comprising a strike mounted on said second bracket which receives a bolt of said latch for releasable securement of said swing bar when in said first position.

27. An adjustable frame according to claim 26, wherein said bolt is spring-biased to engage said strike when said swing bar moves into said first position from said second position.

28. An adjustable frame according to claim 27, wherein said latch bolt does not extend through said second bracket when said swing arm is secured by said strike.

29. An adjustable frame according to claim 26, wherein said second bracket includes a plurality of connection locations defined therealong at different spacings from said second side member for selective connection of said strike to said second bracket at different depths from said second side member.

30. An adjustable frame according to claim 29, wherein each said connection location comprises an array of openings defined by said second bracket, said array of openings corresponding with an array of openings defined by said strike for extension therethrough of removable fasteners.

31. An adjustable frame according to claim 26, further comprising a backstop including a first portion mounted on said second bracket and a second portion extending generally coplanar with said swing bar when in said first position.

32. An adjustable frame according to claim 31, wherein said second portion defines an opening in register with an opening in said swing bar when in said first position for receipt through both said openings of a bolt of a lock.

33. An adjustable frame according to claim 31, wherein said first portion of said backstop is oriented orthogonal to said second portion and wherein said first portion extends between said strike and said second bracket.

34. A frame for retaining a hand truck on a vehicle during transportation, comprising:

a) a bottom support platform adapted to receive a base of the hand truck;

b) first and second side members affixed to said platform and extending upwardly therefrom in spaced, generally parallel relation;

c) a first bracket attached to said first side member and a second bracket attached to said second side member, said brackets extending outwardly from said side members in spaced, generally parallel relation;

d) an elongate swing bar pivotally connected to said first bracket and pivotal between,
  i) a first position, in which said swing bar extends generally between said first and second brackets for retention of the hand truck on said platform, and
  ii) a second position, in which said swing bar extends generally parallel with said brackets for access and removal of the hand truck from the platform;

e) a latch mounted on said swing bar for releasable securement of said swing bar to said second bracket when in said first position; and f) a strike mounted on said second bracket which receives a bolt of said latch for releasable securement of said swing bar when in said first position.

35. A frame according to claim 34, wherein said bolt is spring-biased to engage a catch of said strike when said swing bar moves into said first position from said second position.

36. A frame according to claim 34, further comprising a backstop including a first portion mounted on said second bracket and a second portion extending generally coplanar with said swing bar when in said first position.

37. A frame according to claim 36, wherein said second portion defines an opening in register with an opening in said swing bar for receipt through both said openings of a bolt of a lock.

38. A frame according to claim 36, wherein said first portion of said backstop is oriented orthogonal to said second portion and wherein said first portion extends between said strike and said second bracket.

39. A frame for retaining a hand truck on a vehicle during transportation, comprising:

a) a bottom support platform adapted to receive a base of the hand truck;

b) first and second side members affixed to said platform and extending upwardly therefrom in spaced, generally parallel relation;

c) a first bracket attached to said first side member and a second bracket attached to said second side member, said brackets extending outwardly from said side members in spaced, generally parallel relation;

d) an elongate swing bar pivotally connected to said first bracket and pivotal between
  i) a first position, in which said swing bar extends generally between said first and second brackets for retention of the hand truck on said platform, and
  ii) a second position, in which said swing bar extends generally parallel with said brackets for access and removal of the hand truck from the platform;

e) a latch mounted on said swing bar for releasable securement of said swing bar to said second bracket when in said first position; and f) a crossbar attached to said first and second side members for abutment with the hand truck when retained on the frame, each said side member including a plurality of attachment locations defined therealong at different spacings from said platform for selective attachment of said crossbar to said side members at different heights from said platform.

40. A frame of claim 39 wherein each said attachment location on said first side member comprises an opening that corresponds with an opening defining a said attachment location on said second side member, and wherein said crossbar defines two openings that register with said corresponding openings on said side members for receipt therethrough of removable fasteners such that said crossbar is attached to said side members in substantially horizontal orientation.

41. A frame of claim 39, wherein said crossbar is attached at a different height from said platform than that of said first and second brackets.

42. A frame of claim 39, wherein each said side member comprises a U-shaped rail having front and rear end walls and an intermediate wall with said front and rear end walls extending from said intermediate wall toward the other said side member.

43. A frame of claim 42, wherein said first and second brackets extend outwardly from said front end walls of said first and second side members, respectively, and wherein said crossbar is attached to said rear end walls of said side members.

44. A hand truck mounting frame attachable for use with a vehicular body, comprising:
 a) a hand truck having a base and side rails; and
 b) an adjustable frame mounted on said vehicular body for retaining said hand truck thereon during transportation, said adjustable frame including,
  i) a bottom support platform adapted to receive a base of the hand truck;
  ii) first and second side members affixed to said platform and extending upwardly therefrom in spaced, generally parallel relation;
  iii) a first bracket attached to said first side member and a second bracket attached to said second side member, said brackets extending outwardly from said side members in spaced, generally parallel relation, wherein each said side member includes a plurality of attachment locations defined therealong at different spacings from said platform for selective attachment of said brackets to said side members at different heights from said platform;
  iv) an elongate swing bar pivotally connected to said first bracket and pivotal between
   A) a first position, in which said swing bar extends generally between said first and second brackets for retention of the hand truck on said platform, and
   B) a second position, in which said swing bar extends generally parallel with said brackets for access and removal of the hand truck from the platform; and
  v) a latch mounted on said swing bar for releasable securement of said swing bar to said second bracket when in said first position.

45. A hand truck mounting frame according to claim 44, wherein each said attachment location comprises an array of openings defined by said side member, said array of openings corresponding with an array of openings defined by a said bracket for extension therethrough of removable fasteners.

46. A hand truck mounting frame according to claim 44, further comprising a top crossbar extending between and affixed to said first and second side members opposite said platform and abutting said hand truck when retained by said swing arm on said frame.

47. A hand truck mounting frame according to claim 46, further comprising a cushion portion affixed to the top crossbar in abutting orientation relative to the hand truck.

48. A hand truck mounting frame according to claim 44, wherein said first bracket includes a plurality of connection locations defined therealong at different spacings from said first side member for selective pivotal connection of said swing bar to said first bracket at different depths from said first side member.

49. A hand truck mounting frame according to claim 48, wherein each said connection location comprises an array of openings defined by said first bracket and adapted to receive said swing bar in pivotal connection therein.

50. A hand truck mounting frame according to claim 44, further comprising a strike mounted on said second bracket which receives a bolt of said latch for releasable securement of said swing bar when in said first position.

51. A hand truck mounting frame according to claim 50, wherein said bolt is spring-biased to engage said strike when said swing bar moves into said first position from said second position.

52. A hand truck mounting frame according to claim 50, wherein said latch bolt does not extend through said second bracket when said swing arm is secured by said strike.

53. A hand truck mounting frame according to claim 50, wherein said second bracket includes a plurality of connection locations defined therealong at different spacings from said second side member for selective connection of said strike to said second bracket at different depths from said second side member.

54. A hand truck mounting frame according to claim 53, wherein each said connection location comprises an array of openings defined by said second bracket, said array of openings corresponding with an array of openings defined by said strike for extension therethrough of removable fasteners.

55. A hand truck mounting frame according to claim 44, further comprising a backstop including a first portion mounted on said second bracket and a second portion extending generally coplanar with said swing bar when in said first position.

56. A hand truck mounting frame according to claim 55, wherein said second portion defines an opening in register with an opening in said swing bar when in said first position for receipt through both said openings of a bolt of a lock.

57. A hand truck mounting frame according to claim 50, further comprising a backstop including a first portion mounted on said second bracket and a second portion extending generally coplanar with said swing bar when in said first position.

58. A hand truck mounting frame according to claim 57, wherein said first portion of said backstop is oriented orthogonal to said second portion and wherein said first portion extends between said strike and said second bracket.

59. A hand truck mounting frame according to claim 44, further comprising a crossbar attached to said first and second side members for abutment with the hand truck when retained on the frame, each said side member including a plurality of attachment locations defined therealong at different spacings from said platform for selective attachment of said crossbar to said side members at different heights from said platform.

60. A hand truck mounting frame according to claim 59, wherein each said attachment location on said first side member comprises an opening that corresponds with an opening defining a said attachment location on said second side member, and wherein said crossbar defines two openings that register with said corresponding openings on said side members for receipt therethrough of removable fasteners such that said crossbar is attached to said side members in substantially horizontal orientation.

61. A hand truck mounting frame according to claim 59, wherein said crossbar is attached at a different height from said platform than that of said first and second brackets.

62. A hand truck mounting frame according to claim 59, wherein each said side member comprises a U-shaped rail having front and rear end walls and an intermediate wall with said front and rear end walls extending from said intermediate wall toward the other said side member.

63. A hand truck mounting frame according to claim 62, wherein said first and second brackets extend outwardly from said front end walls of said first and second side members, respectively, and wherein said crossbar is attached to said rear end walls of said side members.

64. A hand truck mounting frame of claim 44, wherein said platform is mounted to a bumper of said vehicular body.

65. Apparatus for releasably retaining a hand truck, comprising:
   a) a bottom support adapted to receive a base of the hand truck;
   b) first and second side members disposed above and extending upwardly from the bottom support in spaced, generally parallel, relation;
   c) a first bracket attached to said first side member and a second bracket attached to said second side member, said brackets extending outwardly from said side members in spaced, generally parallel relation, wherein each said side member includes a plurality of attachment locations defined therealong at different spacings from said bottom support for selective attachment of said brackets to said side members at different heights from said bottom support;
   d) an elongate swing bar pivotally connected to said first bracket and pivotal between
      i) a first position, in which said swing bar extends generally between said first and second brackets for retention of the hand truck on said bottom support, and
      ii) a second position, in which said swing bar extends generally parallel with said brackets for access and removal of the hand truck from the bottom support; and
   e) a latch for permitting releasable securement of said swing bar to said second bracket when in said first position.

66. Apparatus according to claim 65, wherein each said attachment location comprises an array of openings defined by said side member, said array of openings corresponding with an array of openings defined by a said bracket for extension therethrough of removable fasteners.

67. Apparatus according to claim 65, further comprising a top crossbar extending between and affixed to said first and second side members opposite said bottom support, and abutting said hand truck when retained by said swing arm on said adjustable frame.

68. Apparatus according to claim 67, further comprising a cushion portion affixed to the top crossbar in abutting orientation relative to the hand truck.

69. Apparatus according to claim 65, wherein said first bracket includes a plurality of connection locations defined therealong at different spacings from said first side member for selective pivotal connection of said swing bar to said first bracket at different depths from said first side member.

70. Apparatus according to claim 69, wherein each said connection location comprises an array of openings defined by said first bracket and adapted to receive said swing bar in pivotal connection therein.

71. Apparatus according to claim 65, further comprising a strike which receives a bolt of said latch for releasable securement of said swing bar when in said first position.

72. Apparatus according to claim 71, wherein said bolt is spring-biased to engage said strike when said swing bar moves into said first position from said second position.

73. Apparatus according to claim 71, wherein said latch bolt does not extend through said second bracket when said swing arm is secured by said strike.

74. Apparatus according to claim 71, wherein said second bracket includes a plurality of connection locations defined therealong at different spacings from said second side member for selective connection of said strike to said second bracket at different depths from said second side member.

75. Apparatus according to claim 74 wherein each said connection location comprises an array of openings defined by said second bracket, said array of openings corresponding with an array of openings defined by said strike for extension therethrough of removable fasteners.

76. Apparatus according to claim 65 further comprising a backstop including a first portion mounted on said second bracket and a second portion extending generally coplanar with said swing bar when in said first position.

77. Apparatus according to claim 76, wherein said second portion defines an opening in register with an opening in said swing bar when in said first position for receipt through both said openings of a bolt of a lock.

78. Apparatus according to claim 71, further comprising a backstop including a first portion mounted on said second bracket and a second portion extending generally coplanar with said swing bar when in said first position.

79. Apparatus according to claim 78, wherein said first portion of said backstop is oriented orthogonal to said second portion and wherein said first portion extends between said strike and said second bracket.

80. Apparatus according to claim 65, further comprising a crossbar attached to said first and second side members for abutment with the hand truck when retained on the frame, each said side member including a plurality of attachment locations defined therealong at different spacings from said bottom support for selective attachment of said crossbar to said side members at different heights from said bottom support.

81. Apparatus according to claim 80, wherein each said attachment location on said first side member comprises an opening that corresponds with an opening defining a said attachment location on said second side member, and wherein said crossbar defines two openings that register with said corresponding openings on said side members for receipt therethrough of removable fasteners such that said crossbar is attached to said side members in substantially horizontal orientation.

82. Apparatus according to claim 80 wherein said crossbar is attached at a different height from said bottom support than that of said first and second brackets.

83. Apparatus according to claim 80, wherein each said side member comprises a U-shaped rail having front and rear end walls and an intermediate wall with said front and rear end walls extending from said intermediate wall toward the other said side member.

84. Apparatus according to claim 83, wherein said first and second brackets extend outwardly from said front end walls of said first and second side members, respectively, and wherein said crossbar is attached to said rear end walls of said side members.

85. Apparatus according to claim 80, wherein a cushion is affixed to said crossbar in abutting orientation relative to the hand truck.

* * * * *